US012567324B2

(12) United States Patent
Yen

(10) Patent No.: US 12,567,324 B2
(45) Date of Patent: *Mar. 3, 2026

(54) ROUTER-MODEM DEVICE OF ROADWAY EQUIPMENT

(71) Applicant: HUNG MING INFORMATION CO., LTD., Taichung City (TW)

(72) Inventor: Chia Chun Yen, Taichung City (TW)

(73) Assignee: Hung Ming Information Co., Ltd., Taichung City (TW)

( * ) Notice: Subject to any disclaimer, the term of this patent is extended or adjusted under 35 U.S.C. 154(b) by 231 days.

This patent is subject to a terminal disclaimer.

(21) Appl. No.: 18/475,409

(22) Filed: Sep. 27, 2023

(65) Prior Publication Data

US 2024/0346918 A1 Oct. 17, 2024

(30) Foreign Application Priority Data

Apr. 14, 2023 (TW) .................................. 112114110

(51) Int. Cl.
G08G 1/01 (2006.01)
H04L 45/60 (2022.01)
(52) U.S. Cl.
CPC ............ G08G 1/0116 (2013.01); H04L 45/60 (2013.01)
(58) Field of Classification Search
CPC ............................... G08G 1/0116; H04L 45/60
See application file for complete search history.

(56) References Cited

U.S. PATENT DOCUMENTS

2024/0346919 A1 * 10/2024 Yen ..................... H04L 67/5651

FOREIGN PATENT DOCUMENTS

CN 111459891 A * 7/2020 ............. H04L 67/55
CN 112566048 B * 7/2022 ............. H04W 4/80

OTHER PUBLICATIONS

Translation of CN-111459891-A (Year: 2020).*
Translation of CN-112566048-B (Year: 2022).*

* cited by examiner

*Primary Examiner* — Henry Tsai
*Assistant Examiner* — John B Roche
(74) *Attorney, Agent, or Firm* — Rosenberg, Klein & Lee

(57) ABSTRACT

The present invention relates to an improved router data device of roadway equipment that mainly provides all roadway equipment with functions to receive and record the return data transmitted from roadway equipment, such as vehicle detector, changeable message sign, automatic vehicle identification, traffic signal controller, electronic tag and other devices within a specific area, through such an improved router data device that uploads the return traffic data to a management platform center side for analyzing the state of the roadway equipment. The present invention provides effective security monitoring on the roadway equipment, increases the availability and maintenance efficiency of the roadway equipment.

9 Claims, 13 Drawing Sheets

110V-220V power supply input

Figure 12:
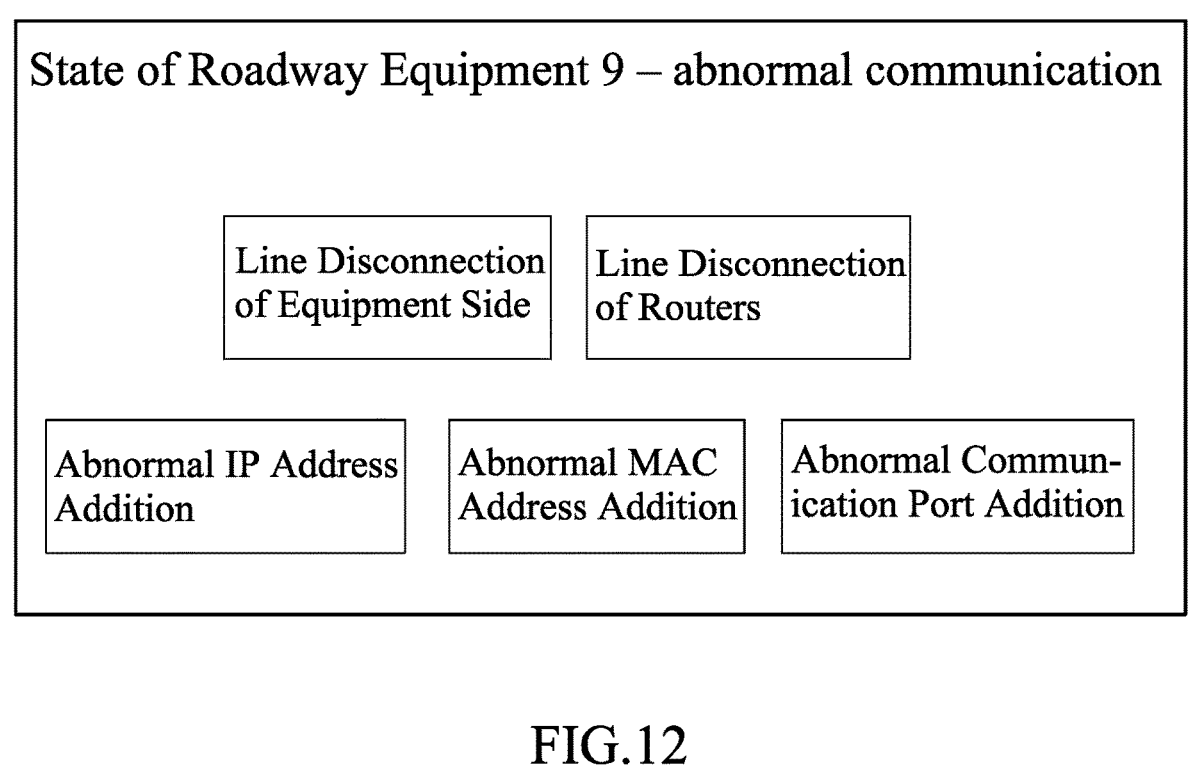

State of Roadway Equipment 9 – abnormal communication

| Line Disconnection of Equipment Side | Line Disconnection of Routers |

| Abnormal IP Address Addition | Abnormal MAC Address Addition | Abnormal Communication Port Addition |

ROUTER-MODEM DEVICE OF ROADWAY EQUIPMENT

1. FIELDS OF THE INVENTION

The present invention relates to the domain of roadway equipment data collection, especially the technical scope of an improved router data device of roadway equipment.

2. DESCRIPTIONS OF RELATED ART

Generally, roadways are equipped with a few devices and equipment, including vehicle detector (VD), changeable message sign (CMS), automatic vehicle identification (AVI), traffic signal controller (TC), detector of the electronic tag (eTag) of an electronic toll collection system, wherein the VD collects data of traffic flows; the CMS posts messages through the communication transport network in order to provide road condition information, traffic propaganda or relevant messages to road users; the AVI identifies and records the time and license plate of each vehicle that passes by the detection point; the TC equipment controls the operation of red, yellow, green traffic lights at the intersection; the eTag detector is used to read data from electronic tags in the passing cars.

As shown in FIG. 13, a roadway equipment 9 currently can control or return data of the traffic and road conditions back to the traffic control center side 7 through a communication network equipment (for example, modem 8) controlled by the traffic control center side 7, which is constructed by the government public sector. The transmission pathway is to first deliver the return traffic data, collected by the roadway equipment 9, to the virtual private network of government service networks (GSN VPN), constructed by internet service providers (ISP), to the traffic control center side 7 through wired network or wireless network methods and using ADSL or a 4G router modem device 8; the last step is to transmit the return data to the traffic control center side 7.

However, the roadway equipment 9 are lack of information security management and can easily become a hacking target. Unused network ports can be a channel easily attacked by hackers. For example, after being infected with virus, a system of traffic control center side 7 stops functioning partially or entirely, or text contents of CMS equipment are altered. Therefore, the existing transmission methods of the roadway equipment 9 for returning traffic data to the control center side need to be improved.

Furthermore, due to the hot and humid summer weather, the roadway equipment 9 are easily overheated and experience system crash; the mechanic components deteriorate faster than those installed indoor, resulting in challenges in and test of the availability of the roadway equipment 9. According to the author's 1133 data records of maintenance logs on power blackout and reboots during the year of 2022, 726 records show that the systems return to a normal operation after blackout/reboot. The aforementioned device of blackout/reboot is located in the equipment side, the maintenance personnel must arrive at the site in person in order to carry out the blackout/reboot action which consumes maintenance manpower significantly.

SUMMARY OF THE INVENTION

In view of the aforementioned problems of the existing roadway equipment in return data transmission and maintenance, authors of the present invention invent an improved router data device of roadway equipment. The main objective of the present invention is to provide an improved router data device of roadway equipment that has higher level of security monitoring in roadway equipment and increases the maintenance efficiency of the roadway equipment. The secondary objective of the present invention is to provide an improved router data device of roadway equipment that works for communication devices of both new equipment side and old equipment side.

In order to achieve the aforementioned objectives, the following technical mean can be applied that includes an improved router data device of roadway equipment, which comprises a communication module, a receiver module, a whitelist database, a judgment module, and a control module, wherein the communication module transmits and receives data packets of roadway equipment out in the fields; the receiver module is electrically connected with the communication module and performs functions of receiving packets of push commands of a management platform center side; the whitelist database is electrically connected with the judgment module and has the function of storing a safety checklist of electronic device identification and network address; the judgment module is electrically connected with the receiver module and provides functions of analyzing packets of the return traffic data transmitted by the roadway equipment and judging command packets; and the control module is electrically connected with the judgment module and is further connected to a relay outside the device; the judgment module issues commands that determine whether the return information sent from the roadway equipment shall be recorded and whether such information conforms an abnormal communication of the equipment side, and executes the blackout/reboot function on devices of the equipment side, wherein the improved router data device can replace the ADSL modem communication device of the equipment side and the original hub can be replaced by a Layer 3 switch;

wherein the improved router data device can simply replace the 4G router-modem communication device of the equipment side;

wherein the relay comprises a MCU unit and a relay switch; both ends of the MCU unit are electrically connected with the control module and the relay switch separately; both ends of the relay switch are connected with a power supply and the roadway equipment separately;

wherein the judgment module determines commands and conditions of abnormal communication of the equipment side that must be recorded; comparison is performed based on the safety checklist of electronic device identification and network address retrieved from the whitelist database; regardless whether a match is found or not, information of the operational actions of the roadway equipment is transmitted to a communication receiving program of a designated communication port specified by the management platform center side;

wherein the communication module only captures and transmits fixed packet headers to the communication receiving program of the designated communication port specified by the management platform center side;

wherein the safety checklist of electronic device identification and network address is a list of communication ports of IP addresses and Mac addresses available for roadway equipment to plug in;

wherein the safety checklist of electronic device identification and network address is updated on a daily basis;

Wherein the communication module can determine whether return traffic data of the roadway equipment can be uploaded to the traffic control center side based on the safety checklist of the electronic device identification and network address in order to ensure security and accuracy of the return traffic data;

wherein an abnormal communication condition of the equipment side refers to line disconnection of equipment side, line disconnection of routers, abnormal IP address addition, abnormal MAC address addition or/and abnormal communication port addition.

Therefore, the present invention adopts the aforementioned technical means to achieve the following effects:

1. The present invention can monitor the return traffic data transmitted from the roadway equipment side in order to determine whether communications of the equipment side is abnormal or not through the use of the judgment module, in conjunction with the whitelist database, for example, by monitoring conditions of "line disconnection of equipment side", "line disconnection of routers", "abnormal IP address addition", "abnormal MAC address addition" or/and "abnormal communication port addition". When an abnormal condition is detected, the abnormal data then will be further analyzed by the management platform center side for subsequent processing.

2. When devices of the roadway equipment side may be overheated and experience system crash, the improved router data device of roadway equipment of the present invention can issue commands of blackout/reboot remotely to the aforementioned devices, in order to improve the availability and maintenance efficiency of the roadway equipment.

3. The improved router data device of roadway equipment of the present invention can replace the existing ADSL modems or/and 4G router-modem devices, used by internet service providers (ISP), for its better applicability.

The present invention will become more fully understood from the detailed description given herein below for illustration only which thus does not limit the present invention, wherein:

BRIEF DESCRIPTION OF THE DRAWINGS

FIG. 12 is a schematic diagram of a few forms of abnormal communication of the equipment side of the present invention.

DETAILED DESCRIPTION OF THE PREFERRED EMBODIMENT

Figure 1:
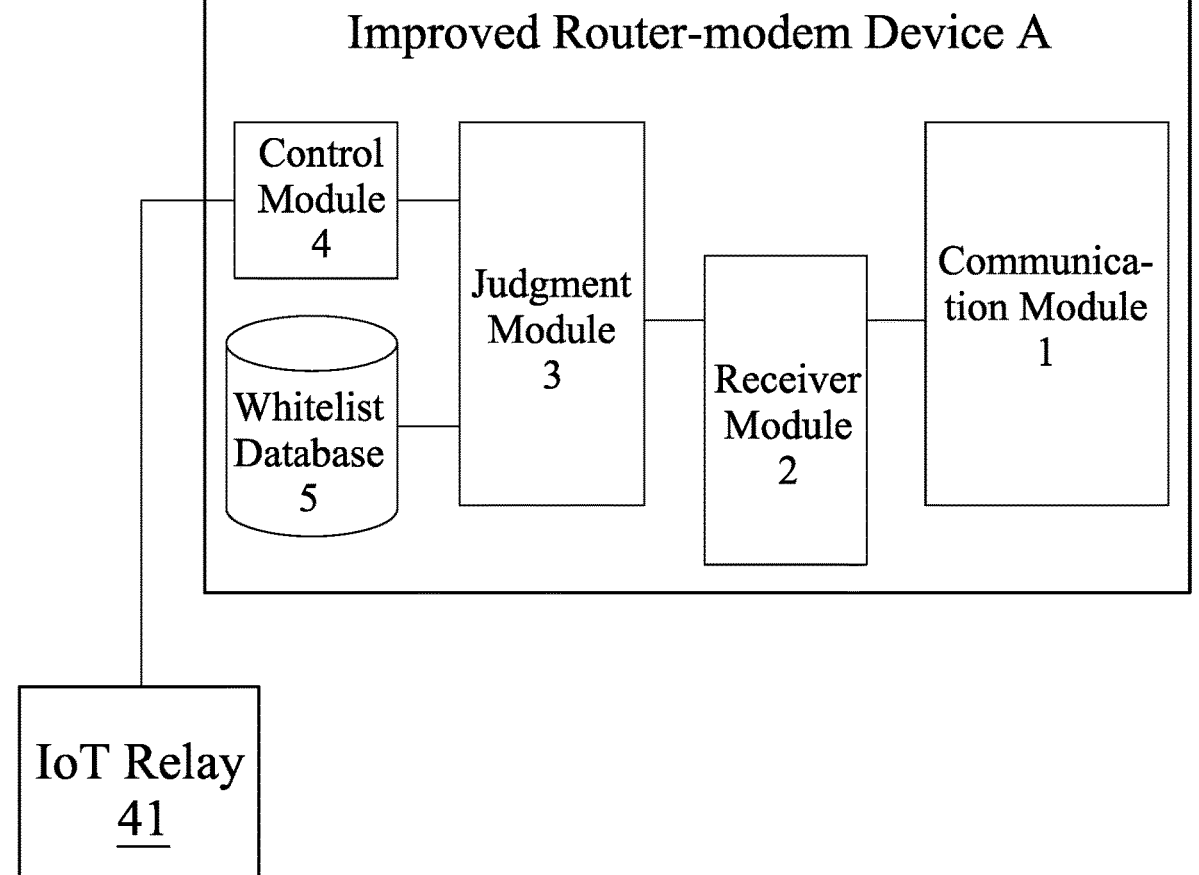
FIG. 1 is an architecture diagram of the improved router data device of the present invention.
Figure 2:
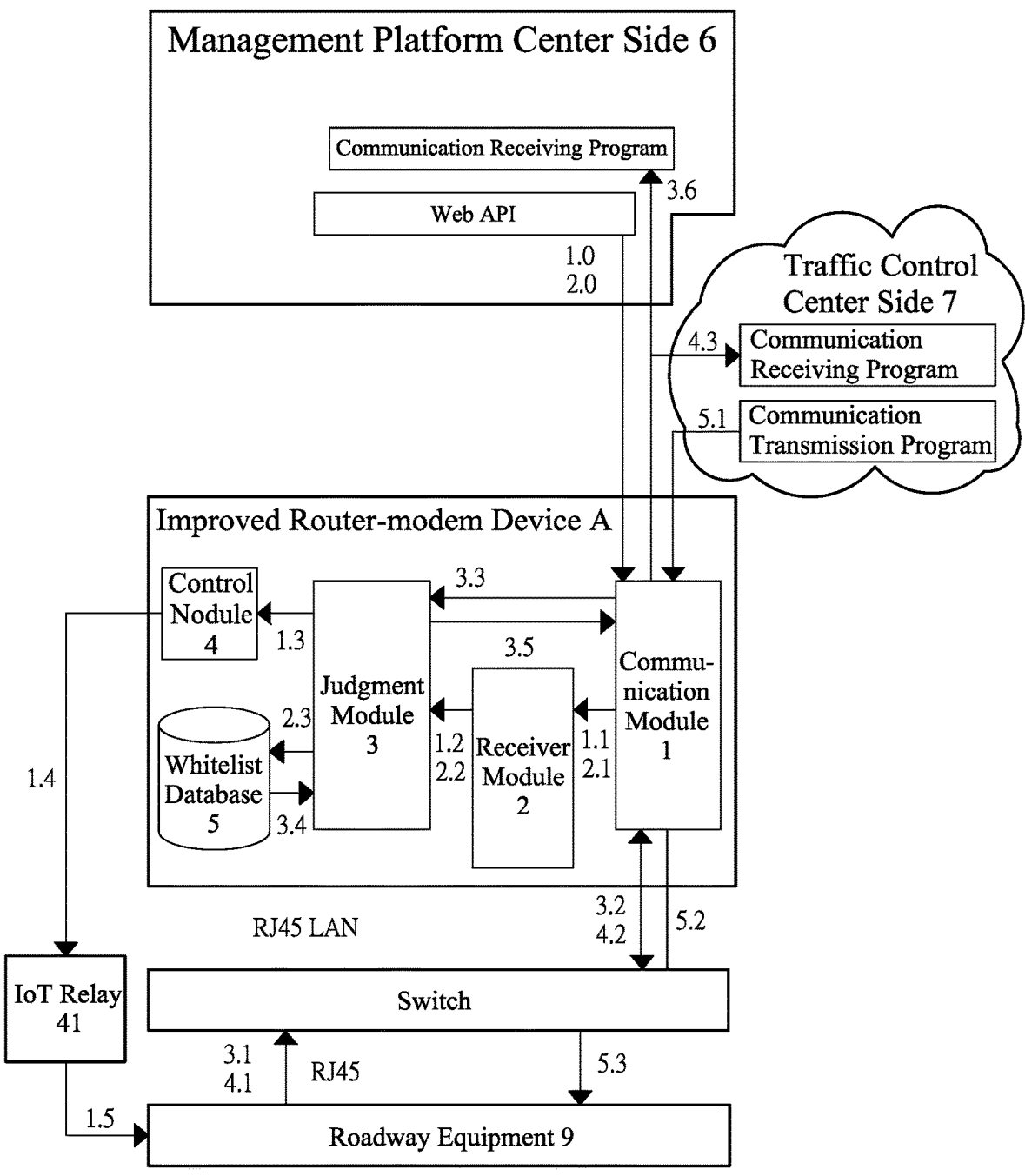
FIG. 2 is an overall action schematic diagram of the improved router data device of the present invention.
Figure 3:
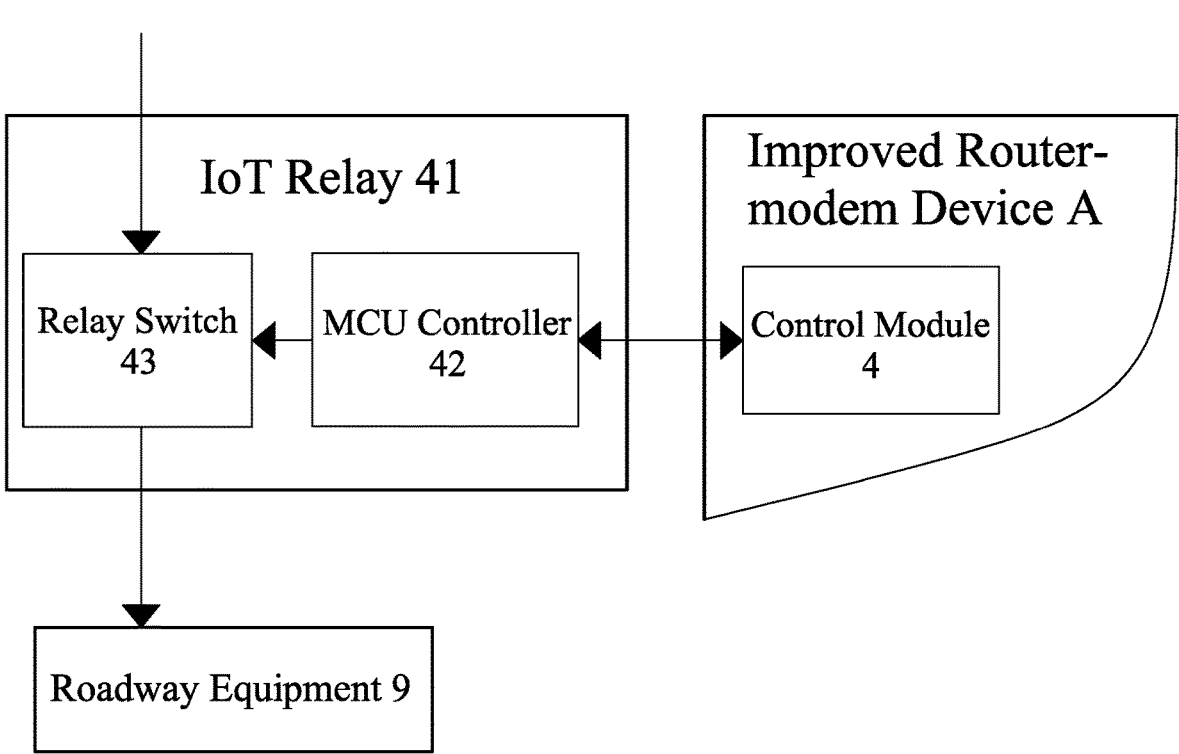
FIG. 3 is an architecture diagram of the IoT relay of the present invention.

The present invention relates to an improved router data device that mainly provides all roadway equipment 9 with functions to receive, record, and monitor return traffic data, transmitted by a plurality of roadway equipment 9, such as vehicle detector, changeable message sign, automatic vehicle identification, traffic signal controller, electronic tag and other devices within a specific area through such an improved router data device A, which replaces the existing modems and communication equipment. The improved router data device of the present invention also can upload the return traffic data to a management platform center side 6 for analysis through the virtual private network of government service networks (GSN VPN) in order to provide effective security monitoring on the roadway equipment 9, increases the availability and maintenance efficiency of the roadway equipment. The improved router data device A, as shown in FIG. 1 to FIG. 4, comprises key components of a communication module 1, a receiver module 2, a judgment module 3, a control module 4, or/and a whitelist database 5. Descriptions of the aforementioned components are provided as follows.

The communication module 1 transmits the return traffic data and receives packets of commands, wherein when the roadway equipment 9 delivers the equipment information through wired network or wireless network methods, the communication module 1 will transmit such information to the judgment module 3.

The receiver module 2 is electrically connected with the communication module 1 and performs functions of receiving packets of Web API push commands of the management control center side 6.

The judgment module 3, which is electrically connected with the receiver module 2, provides functions of analyzing packets of the return traffic data transmitted by the roadway equipment 9 and determining command packets, wherein the judgment module 3 issues commands that determine whether the return information sent from the roadway equipment 9 shall be recorded and whether such information conforms an abnormal communication of the equipment side. If the condition is judged as an abnormal communication, the condition shall be checked by matching with a safety checklist of electronic device identification and network address (commonly known as the "whitelist" in the industry; hereinafter referred to as "the whitelist") retrieved from the whitelist database 5. Regardless whether a match is found or not, information of the operational actions of the roadway equipment 9 is transmitted by the communication module 1 to a communication receiving program of a designated communication port specified by the management platform center side 6; only fixed packet headers are transmitted to prevent the communication in the equipment side from overload. In general, the electronic devices listed in the safety checklist of electronic device identification and network address refer to single chips, IPC computers, tablet computers, notebook computers, and desktop computers.

The control module 4, which is electrically connected with the judgment module 3, is further connected to an IoT relay 41 outside the device, wherein the IoT relay 41 comprises a MCU unit 42 and a relay switch 43; both ends of the MCU unit 42 are electrically connected with the control module 4 and the relay switch 43 separately. Both ends of the relay switch 43 are connected with an 110V-220V power supply and the roadway equipment 9 separately.

The whitelist database 5, which is electrically connected with the judgment module 3, has the function of storing the whitelists, wherein the whitelist database is updated on a daily basis; the whitelist can provide the communication ports of IP addresses and Mac addresses available to be used by roadway equipment 9 to transmit the return traffic data.

Figure 4:
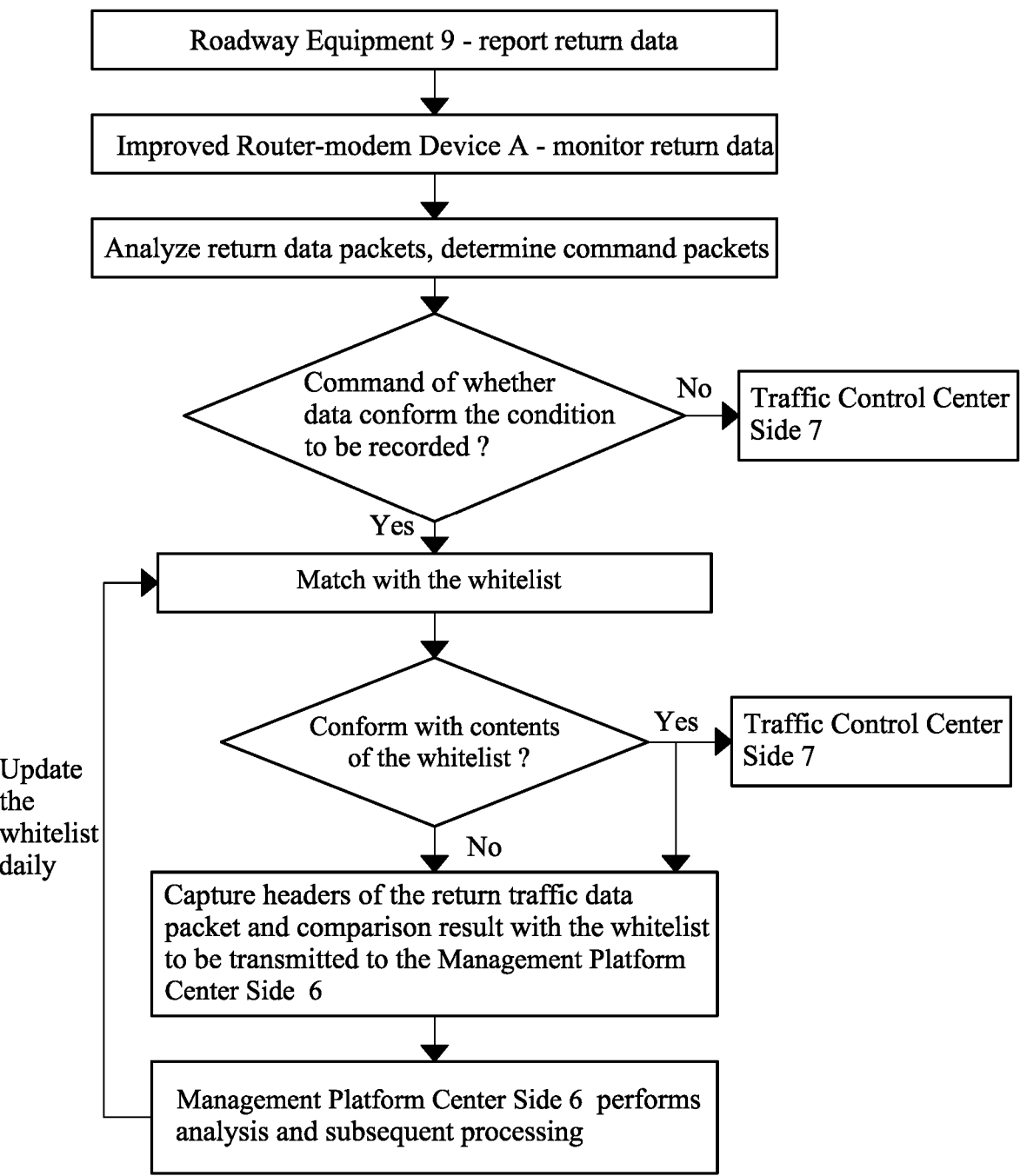
FIG. 4 is a flow chart of the overall operation of the improved router data device of the present invention monitoring return traffic data transmitted from the equipment side.

Therefore, the improved router data device A of the present invention mainly provides optimal solutions for roadway equipment 9, as shown in FIG. 4. When a roadway equipment 9 transmits return traffic data, the improved router data device A monitors such data, analyzes packets of the return traffic data and command packets transmitted by the roadway equipment 9. If the packet of the return traffic data needs to be recorded, the judgment module 3 will retrieve the whitelist from the whitelist database 5 to process matching. Regardless whether a match is found within the whitelist or not, the header of the return traffic data packet and the comparison result with the whitelist, together with information of the operational actions of the roadway equipment 9, will be captured and transmitted by the communication module 1 to a communication receiving program of a designated communication port specified by the management platform center side 6, so that the management platform center side 6 can perform analysis and subsequent processing. For instance, if no match in IP or MAC PORT of the whitelist is detected, there is a strong possibility that the system is under attack by hackers. On the other hand, if the packet of return traffic data does not need to be recorded and has a match in the whitelist, the return traffic data of the roadway equipment 9 will be transmitted directly to the traffic control center side 7 by the communication module 1.

Figure 5:
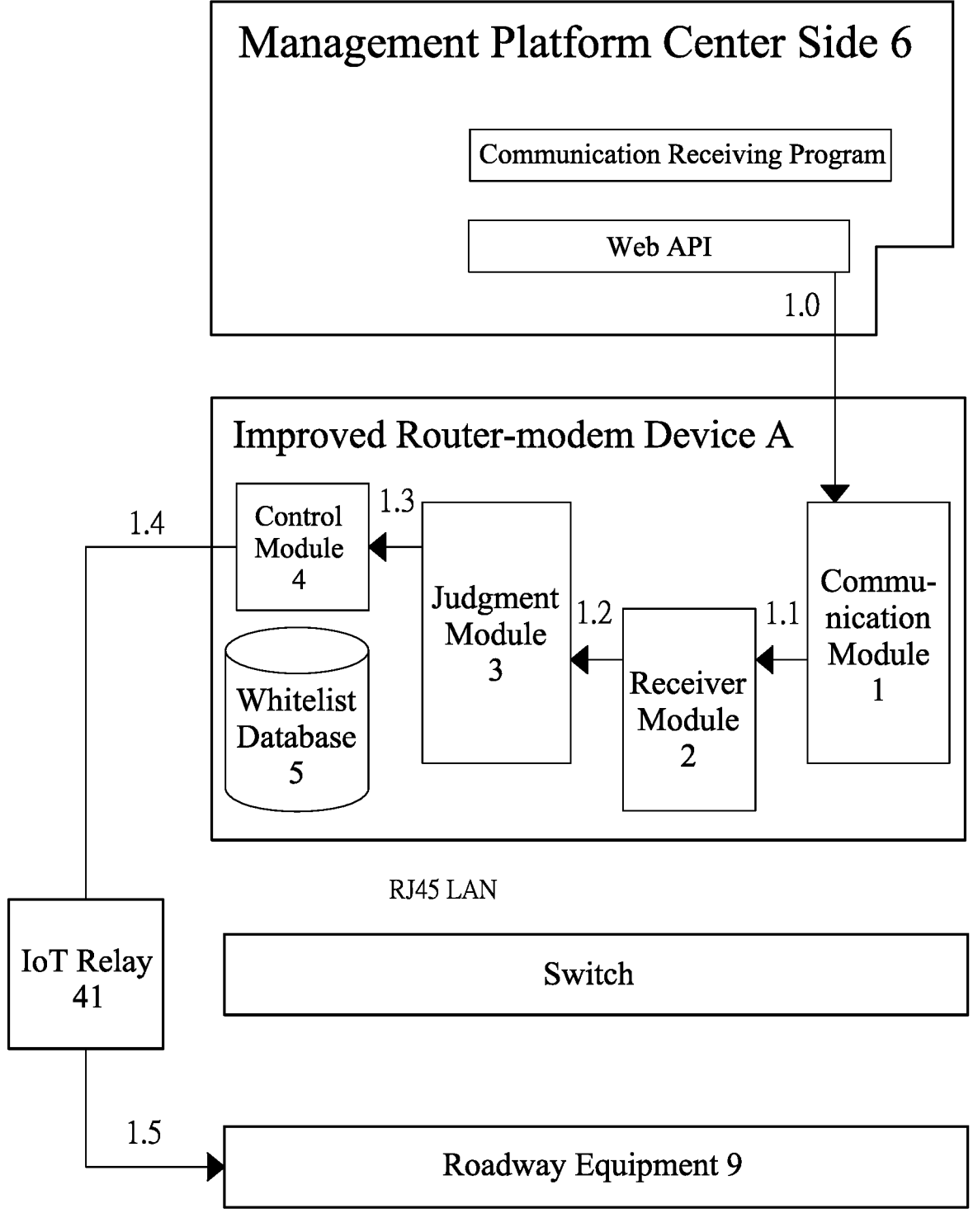
FIG. 5 is an action flow chart of the improved router data device of the present invention performing the blackout/reboot action.
Figure 6:
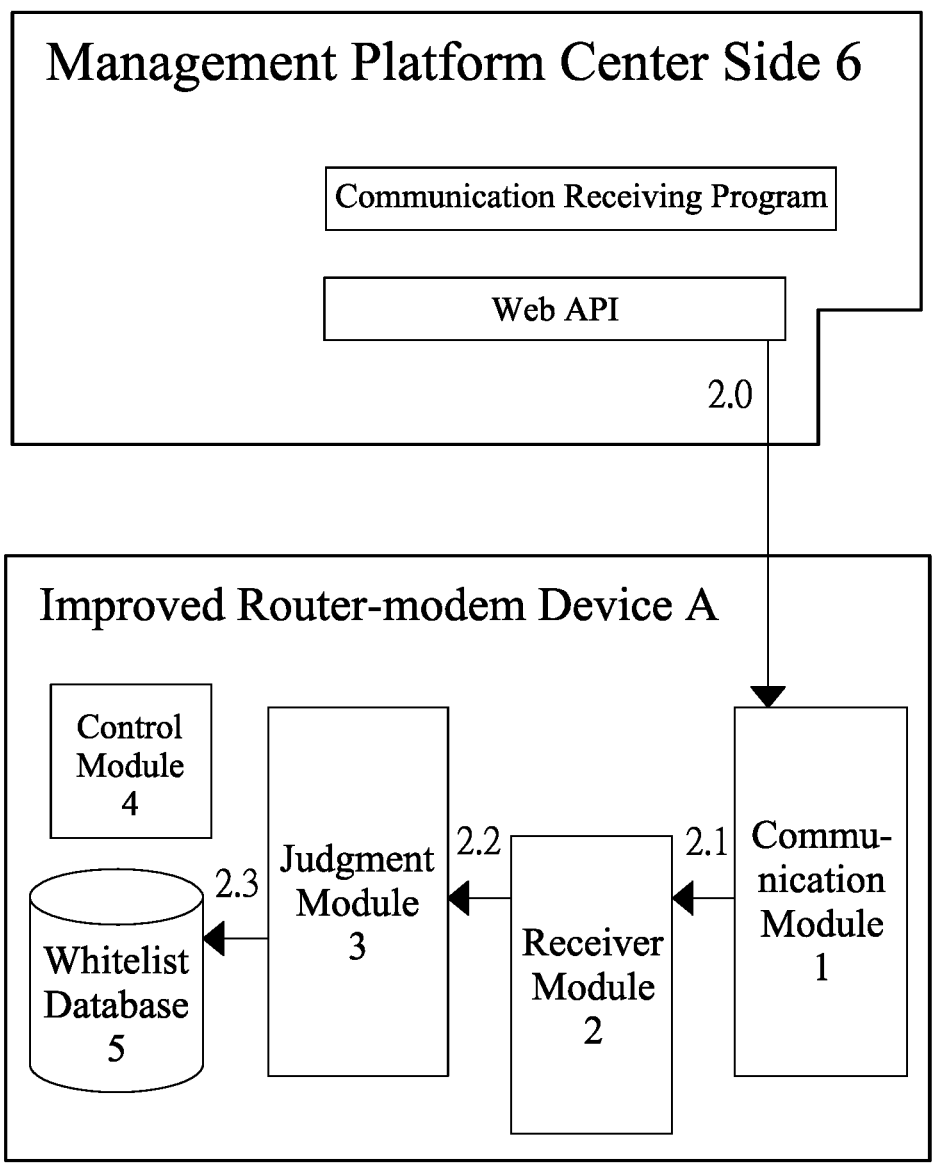
FIG. 6 is an action flow chart of the improved router data device of the present invention updating the whitelist on a daily basis.

When the improved router data device A executes the blackout/reboot operation on devices of the equipment side, as shown in FIG. 5, the implementation pathway is from steps 1.0 to 1.5, wherein ⌈1.0: aperiodic push command⌋→⌈1.1: accepting push command from Web API⌋→⌈1.2: analyzing packet; judging command⌋→⌈1.3: blackout/reboot command⌋→⌈1.4: enabling IoT relay⌋→⌈1.5: rebooting roadway equipment after blackout⌋. The aforementioned implementation pathway can reboot the roadway equipment 9 remotely.

When the improved router data device A is updating the whitelist, the implementation pathway is from steps 2.0 to 2.3, wherein ⌈2.0: daily update⌋→⌈2.1: accepting push command from Web API⌋→⌈2.2: analyzing packet; judging command⌋→⌈2.3: updating IP communication port and MAC address of the whitelist⌋. This implementation pathway can update the whitelist of the whitelist database 5 daily.

Figure 7:
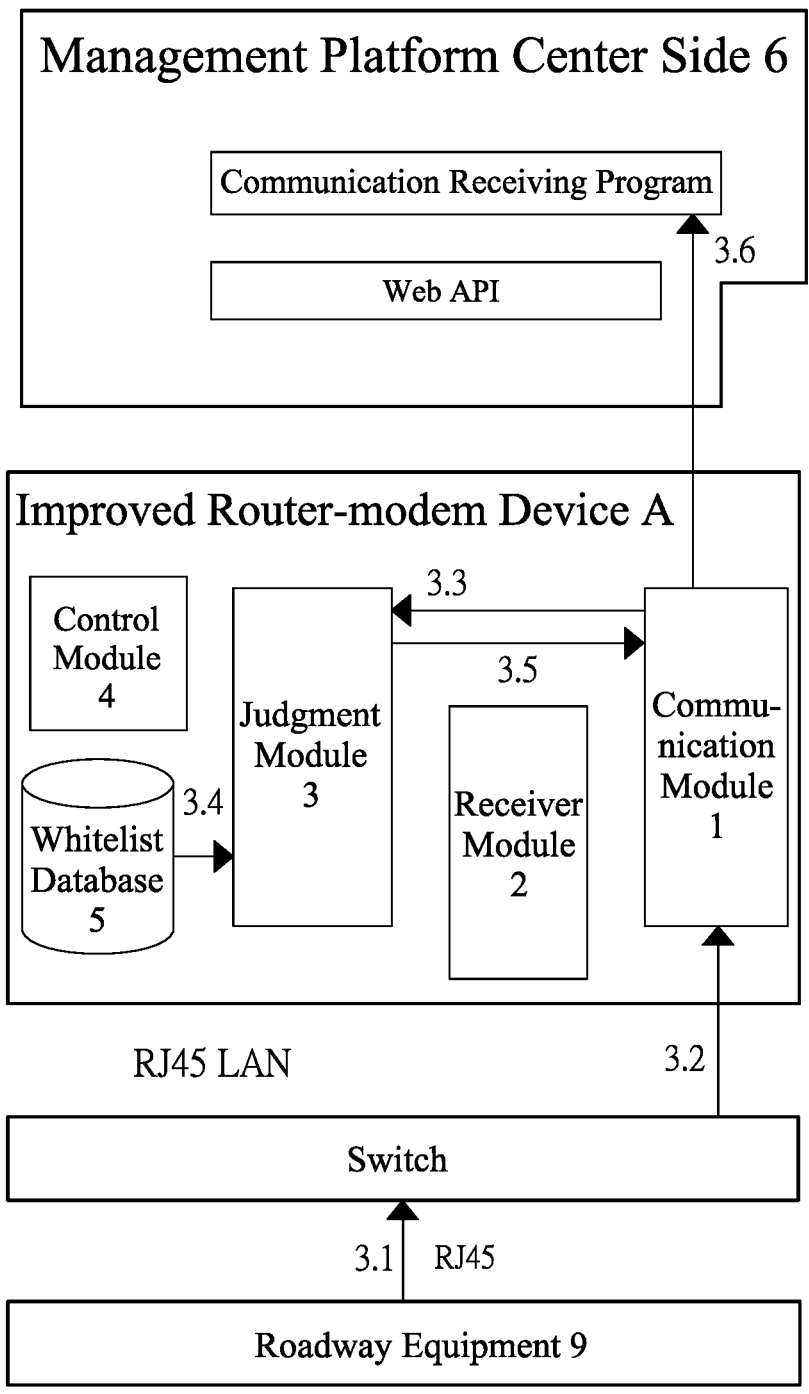
FIG. 7 is an action flow chart of the improved router data device of the present invention monitoring the return traffic data transmitted from the roadway equipment side.

When the improved router data device A is transmitting return data of the equipment side and detects whether abnormal communication conditions exist, as shown in FIG. 7, the implementation pathway is from steps 3.1 to 3.6, wherein ⌈3.1: reporting from equipment on equipment information (VD: traffic volume, velocity, and density; CMS: changeable Message currently displayed . . . )⌋→⌈3.2: data flowing from switch to router⌋→⌈3.3: command of judging whether message shall be recorded, and whether message conforming conditions of abnormal communication, including line disconnection of equipment side, line disconnection of routers, abnormal IP address addition, abnormal MAC address addition, and abnormal communication port addition⌋→⌈3.4: Retrieving whitelist for matching⌋→⌈3.5: regardless whether a match is found in whitelist, operational actions of equipment are transmitted through communication module 1⌋→⌈3.6: message received by communication receiving program 21 of designated communication port. The improved router data device A will transmit a message of the abnormal condition to the management platform center side 6 in order to determine the state of the roadway equipment 9 and subsequent processing, such as blackout/reboot or maintenance dispatch. For one other example, when the improved router data device A is detecting whether it is an abnormal communication, a PING command is usually issued to the roadway equipment 9 and the traffic control center side 7 in order to test whether line disconnection in communication exists. If an abnormal communication exists, then the improved router data device A will transmit this message to the management platform center side 6 for conducting subsequent maintenance.

Figure 8:
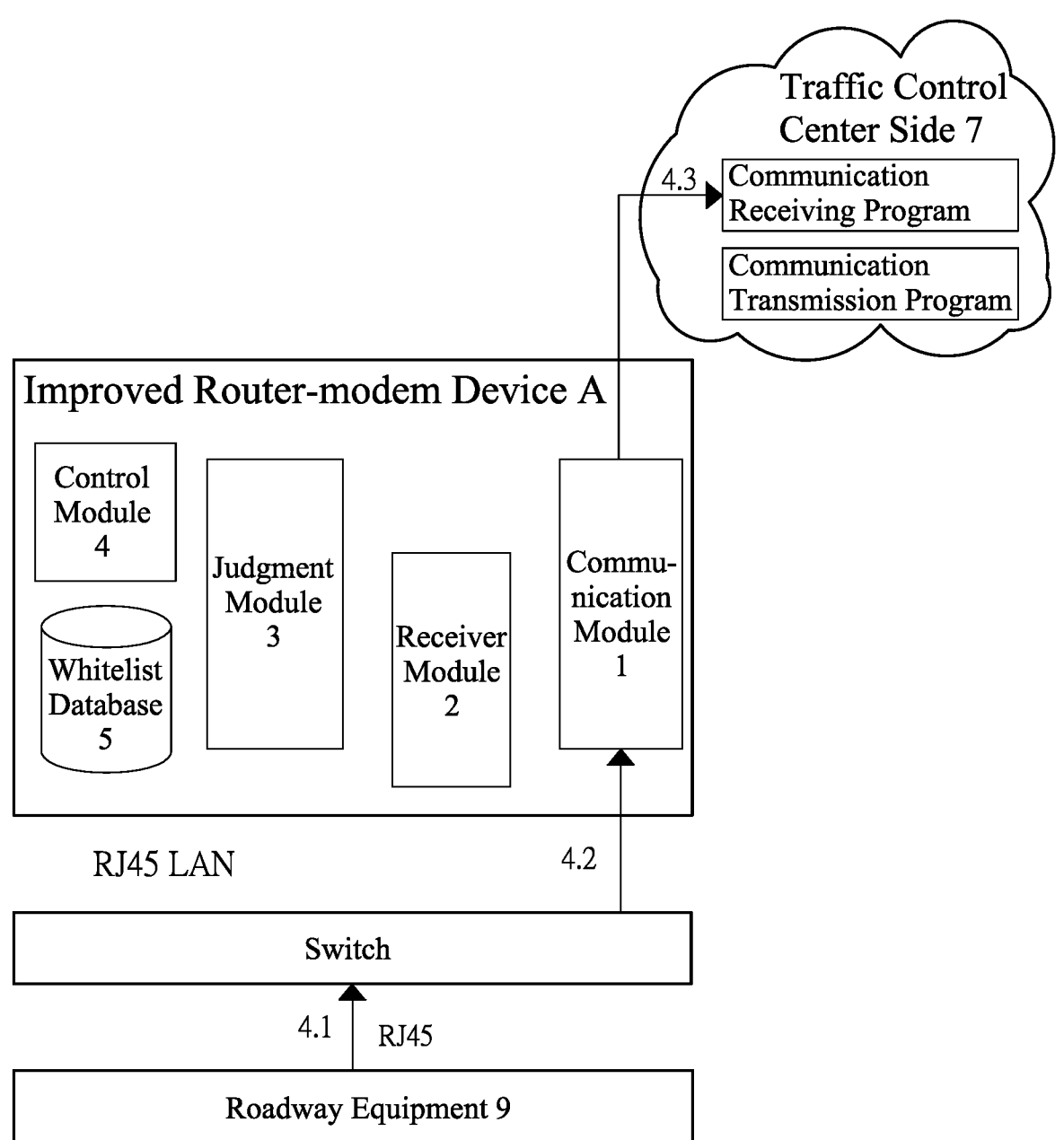
FIG. 8 is an action flow chart of the improved router data device of the present invention uploading the return traffic data transmitted from the roadway equipment side.

When the improved router data device A is transmitting return data of the equipment side, as shown in FIG. 8, the implementation pathway is from steps 4.1 to 4.3, wherein ⌈4.1: reporting from equipment on equipment information (VD: traffic volume, velocity, and density; CMS: changeable Message currently displayed . . . )⌋ . . . )⌋→⌈4.2: data flowing from switch to router⌋→⌈4.3: data received by traffic control center side 7⌋. Normal and no abnormal return data are transmitted directly to the traffic control center side 7.

Figure 9:
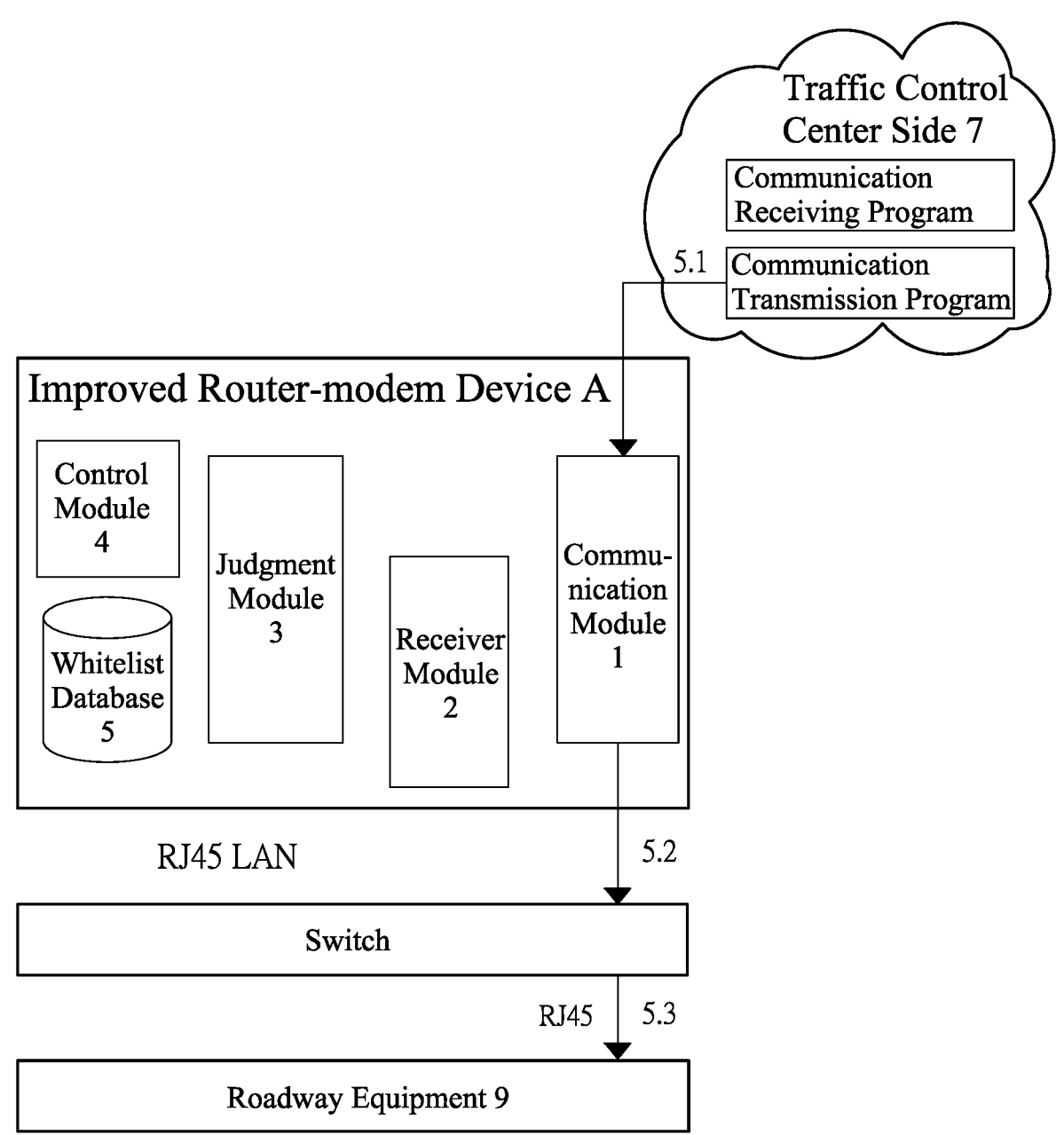
FIG. 9 is an action flow chart of the traffic control center side issuing commands to the equipment side through the improved router data device of the present invention.

When the improved router data device A is executing commands issued by the traffic control center side 7, as shown in FIG. 9, the implementation pathway is from steps 5.1 to 5.3, wherein ⌈5.1: traffic control center side 7 issuing commands⌋→⌈5.2: transmitting data⌋→⌈5.3: transmitting data to roadway equipment 9⌋. In this implementation pathway, the traffic control center side 7 obtains the control right from the roadway equipment 9. Taking traffic signals as an example, the SET command is to change the interval time (in second) of the red signal light at the time; the GET command is to get the time duration (in second) of the red signal light at the time.

Figure 10:
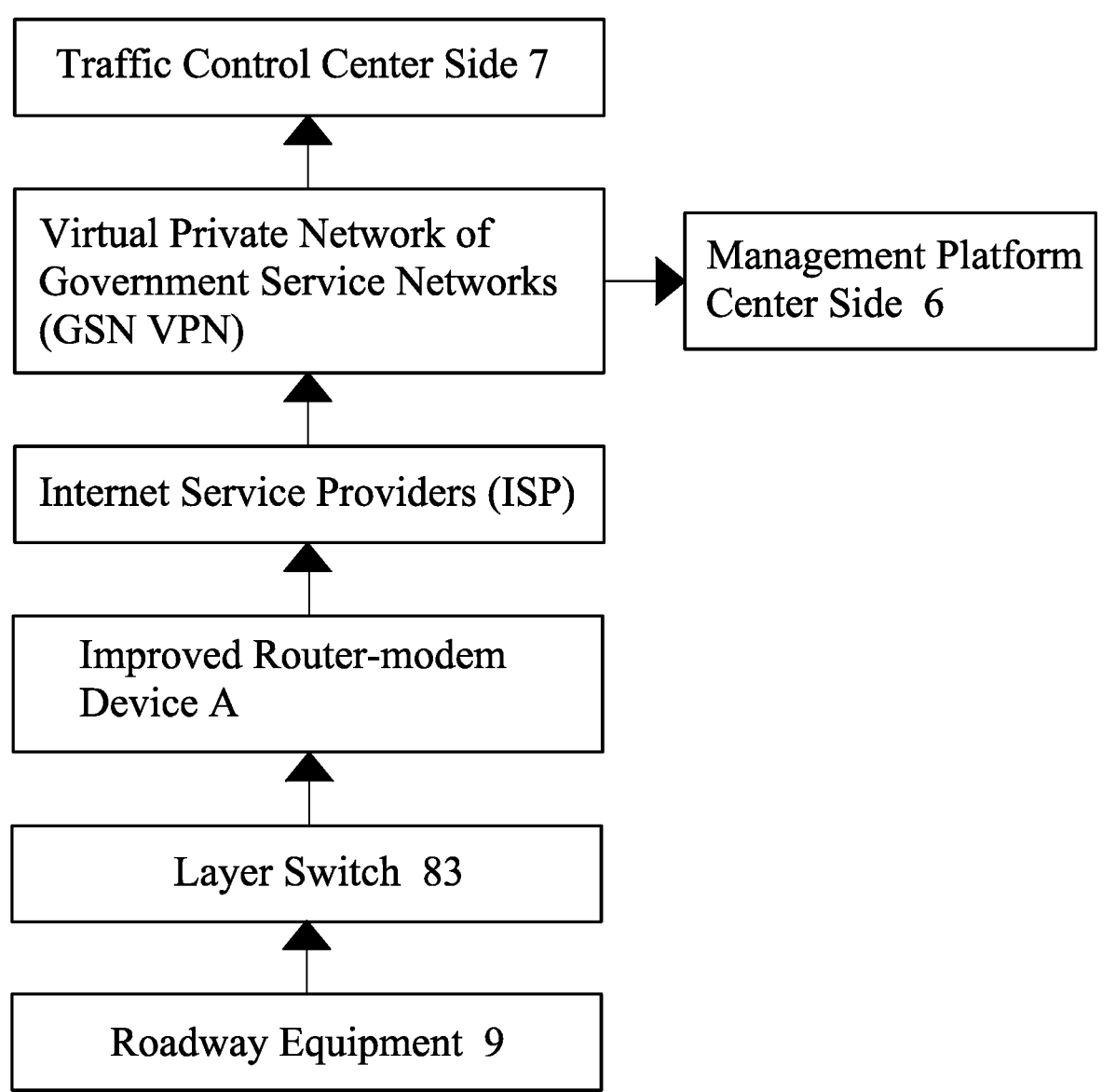
FIG. 10 is a schematic diagram of an embodiment of the improved router data device of the present invention.
Figure 11:
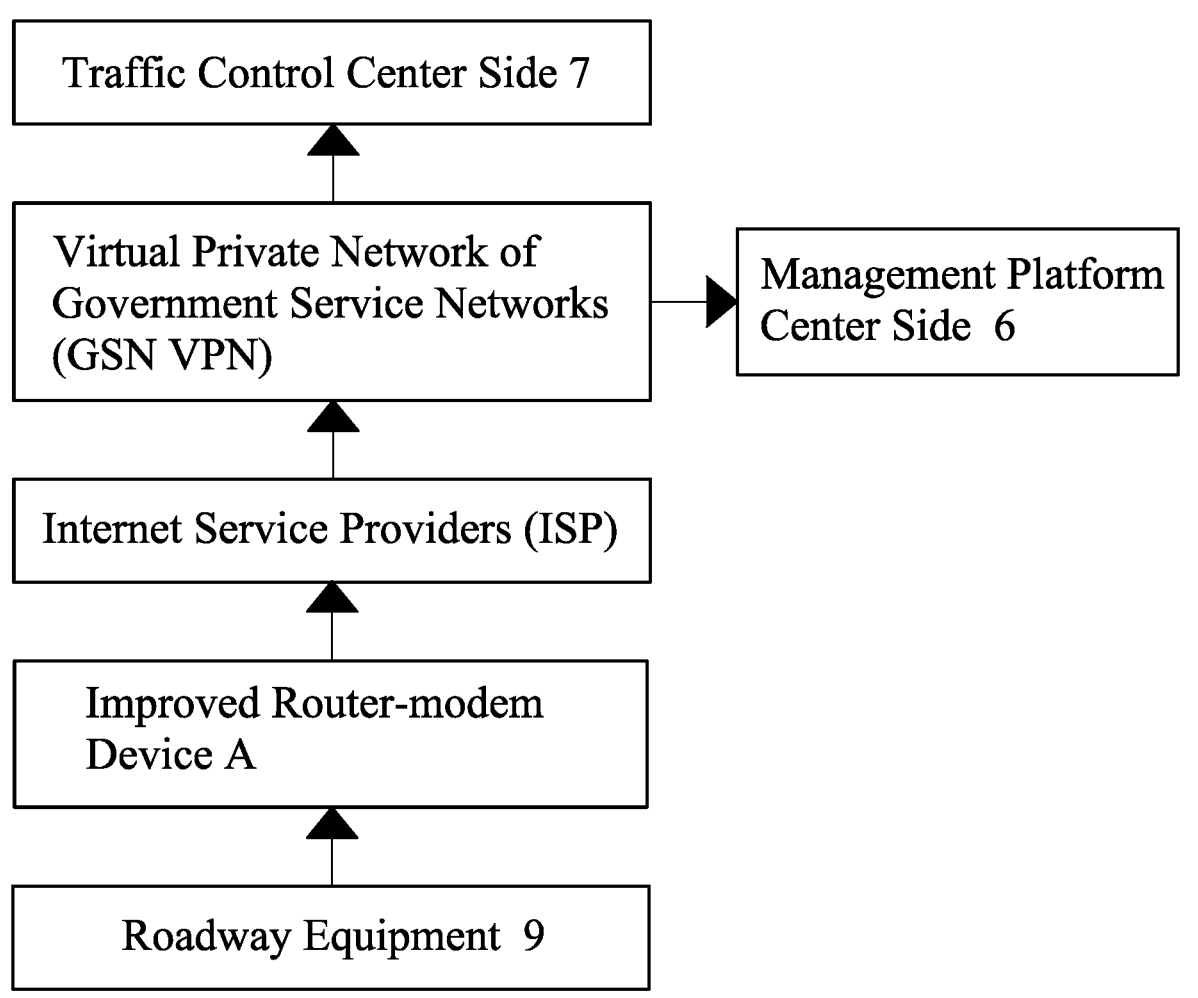
FIG. 11 is a schematic diagram of another embodiment of the improved router data device of the present invention.
Figure 13:
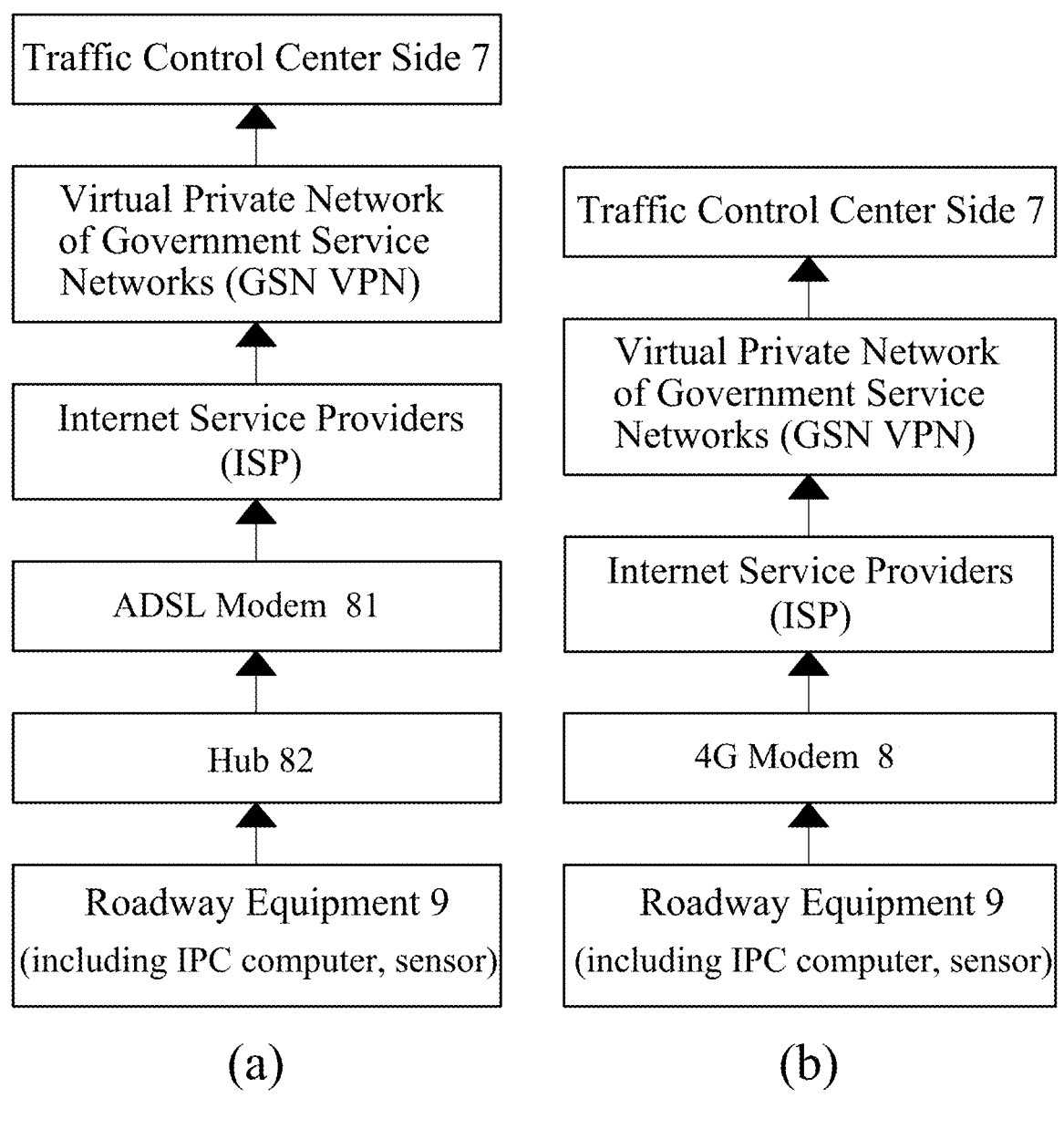
FIG. 13 is a schematic diagram of the internet-connected pathway for returning data of conventional roadway equipment.

During the implementation of the improved router data device A of the present invention, the improved router data device A is used to replace the existing conventional internet-connected roadway equipment. In general, all conventional roadway equipment 9 within a specific area use two types of internet-connected modems 8, namely ADSL and 4G routers, as shown in FIG. 13. Therefore, the improved router data device A is used to replace such two types of modems 8 during the implementation. The replacement method is that if an ADSL modem 81 is used as the internet-connected equipment, as shown in FIG. 10, then an improved router data device A in conjunction with a Layer 3 switch 83 are used to replace the original ADSL modem 81 and hub 82; if a 4G router-modem 8 is used as the internet-connected equipment, as shown in FIG. 11, then an improved router data device A is used to replace the 4G modem 8.

In summary, the improved router data device A can monitor the return traffic data transmitted from the equipment side and determine whether the communication condition of the equipment side is abnormal or not through the judgment module 3 in conjunction with the whitelist database 5, as shown in FIG. 12. For example, the abnormal communication conditions being monitored include "line disconnection of equipment side", "line disconnection of routers", "abnormal IP address addition", "abnormal MAC address addition" or/and "abnormal communication port addition". If the condition is determined as an abnormal communication, the abnormal data will be further analyzed by the management platform center side 6 for subsequent processing. For example, when a suspected abnormal roadway equipment 9 undergoes a blackout/reboot process and still cannot be recovered, the management platform center side 6 can schedule a date for remote repair or dispatching an on-site repair. At the same time, on the date of conducting the on-site repair, the IP or MAC port that is expected to be applied shall be included in the whitelist of the improved router data device in advance through the update process, for the ease of repair work by the dispatched personnel. The designs and architecture structures of the present invention are not found in any published reports nor available to the public. Therefore, the present invention meets the requirements for patentability and, therefore, hereby the application is submitted.

The examples described above are a few preferred embodiments and the implementation of technical knowhow of the present invention. Alternative embodiments will become apparent to those skilled in the art to which the present invention described in the patent specification and the appended claims pertains without departing from its spirit and scope.

What is claimed is:

1. An improved router data device of roadway equipment, which comprises a communication module, a receiver module, a whitelist database, and a judgment module, wherein the communication module transmits and receives data packets of roadway equipment out in the fields;

the receiver module is electrically connected with the communication module and performs functions of receiving packets of push commands of a management platform center side;

the whitelist database is electrically connected with the judgment module and has the function of storing a safety checklist of electronic device identification and network addresses;

the judgment module is electrically connected with the receiver module and provides functions of analyzing packets of the return traffic data transmitted by the roadway equipment and judging command packets; and the improved router data device is used to replace modems of the communication equipment of the equipment side.

2. The improved router data device of roadway equipment as claimed in claim 1, wherein the improved router data device further comprises a control module, which is electrically connected with the judgment module and is connected to a relay outside the device.

3. The improved router data device of roadway equipment as claimed in claim 2, wherein the relay comprises a microcontroller unit (MCU) and a relay switch;

both ends of the MCU are electrically connected with the control module and the relay switch separately; and both ends of the relay switch are connected with a power supply and the roadway equipment separately in order to execute the blackout/reboot function on devices of the equipment side.

4. The improved router data device of roadway equipment as claimed in claim 2, wherein the judgment module determines commands and conditions of an abnormal communication of the equipment side that must be recorded;

a comparison is performed based on the safety checklist of electronic device identification and network address retrieved from the whitelist database; and regardless whether a match is found or not, information of the operational actions of the roadway equipment is transmitted to a communication receiving program of a designated communication port specified by the management platform center side.

5. The improved router data device of roadway equipment as claimed in claim 4, wherein the communication module only captures and transmits fixed packet headers to the communication receiving program of the designated communication port specified by the management platform center side.

6. The improved router data device of roadway equipment as claimed in claim 1, wherein the safety checklist of electronic device identification and network addresses is a list of communication ports of IP addresses and MAC addresses available for roadway equipment to plug in.

7. The improved router data device of roadway equipment as claimed in claim 6, wherein the safety checklist of electronic device identification and network addresses is updated on a daily basis.

8. The improved router data device of roadway equipment as claimed in claim 6, wherein the communication module can determine whether return traffic data of the roadway equipment can be uploaded to the traffic control center side based on the safety checklist of the electronic device identification and network addresses in order to ensure security and accuracy of the return traffic data.

9. The improved router data device of roadway equipment as claimed in claim 1, wherein an abnormal communication condition of the equipment side refers to line disconnection of equipment side, line disconnection of routers, abnormal IP address addition, abnormal MAC address addition or/and abnormal communication port addition.

* * * * *